No. 672,172. Patented Apr. 16, 1901.
F. L. KOEHLER.
BICYCLE OR VEHICLE SPRING BEARING.
(Application filed June 26, 1899.)
(No Model.) 4 Sheets—Sheet 1.
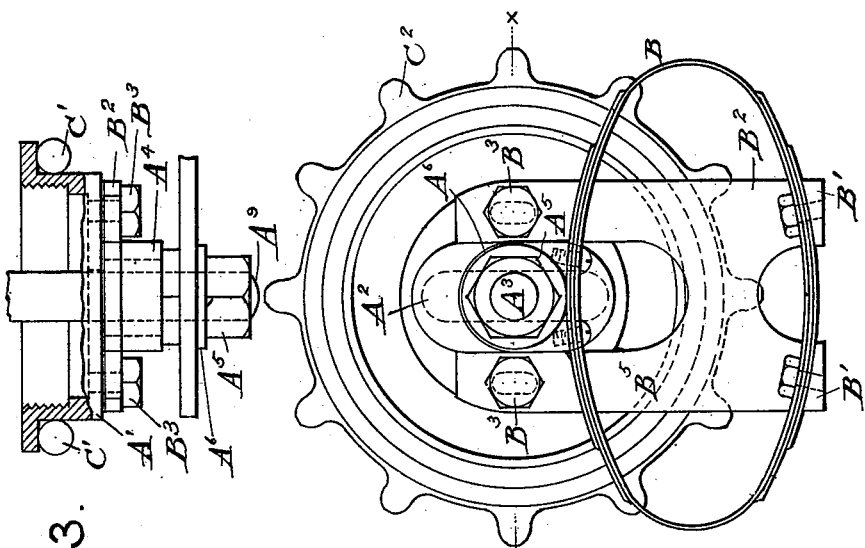
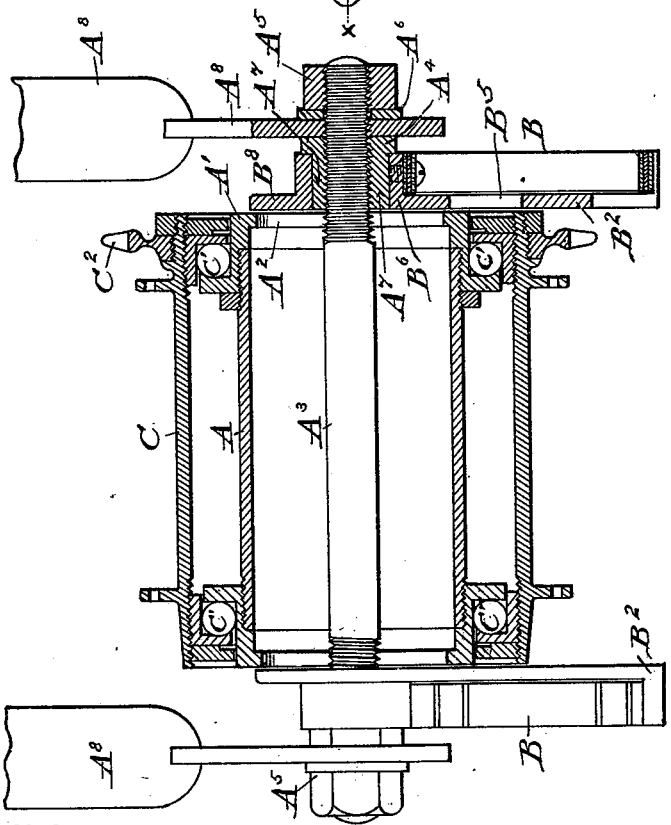
WITNESSES:
INVENTOR
Fred L. Koehler
BY Alfred Meltzer
his ATTORNEY.

No. 672,172. Patented Apr. 16, 1901.
F. L. KOEHLER.
BICYCLE OR VEHICLE SPRING BEARING.
(Application filed June 26, 1899.)
(No Model.) 4 Sheets—Sheet 2.
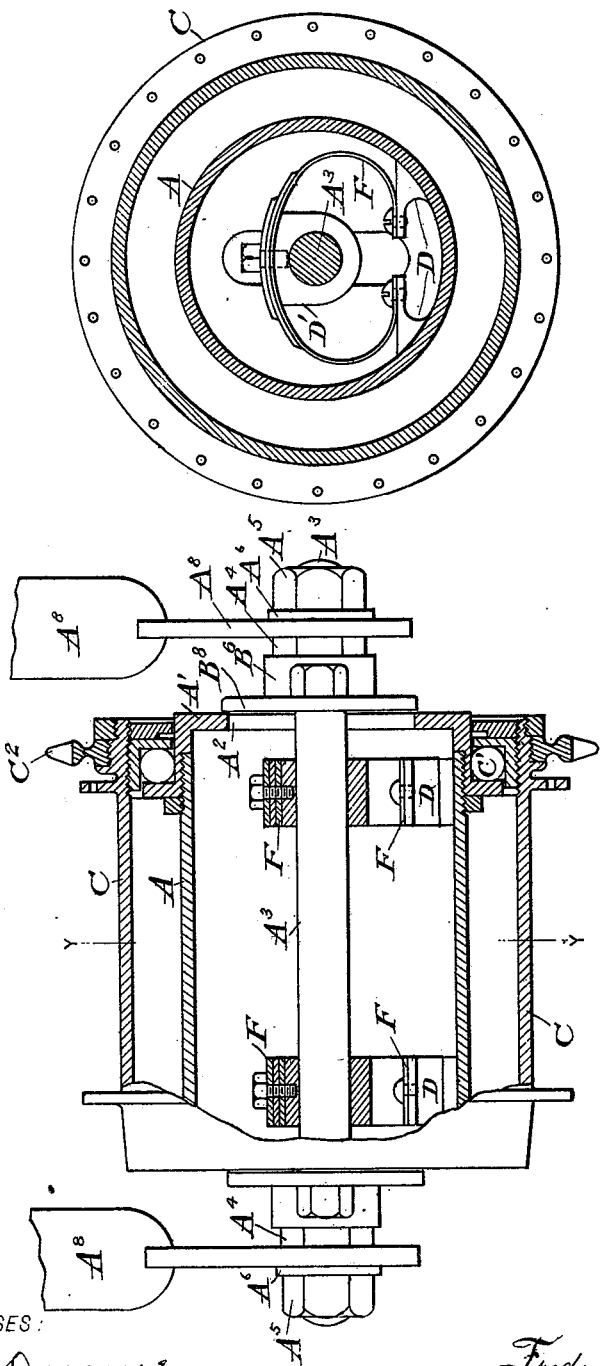
WITNESSES:
INVENTOR
Fred L. Koehler,
BY
Alfred Meltzer
his ATTORNEY.

No. 672,172. Patented Apr. 16, 1901.
F. L. KOEHLER.
BICYCLE OR VEHICLE SPRING BEARING.
(Application filed June 26, 1899.)
(No Model.) 4 Sheets—Sheet 3.

WITNESSES:
Thomas J. Dunne
Wm R Rummler

INVENTOR
Fred L. Koehler,
BY
Alfred Metzger
his ATTORNEY.

THE NORRIS PETERS CO., PHOTO-LITHO., WASHINGTON, D. C.

No. 672,172. Patented Apr. 16, 1901.
F. L. KOEHLER.
BICYCLE OR VEHICLE SPRING BEARING.
(Application filed June 26, 1899.)
(No Model.) 4 Sheets—Sheet 4.

WITNESSES:

INVENTOR
Fred L. Koehler,
BY Alfred Meltzer,
his ATTORNEY.

UNITED STATES PATENT OFFICE.

FRED L. KOEHLER, OF CHICAGO, ILLINOIS, ASSIGNOR OF ONE-THIRD TO THOMAS J. DUNNE, OF DUBUQUE, IOWA.

BICYCLE OR VEHICLE SPRING-BEARING.

SPECIFICATION forming part of Letters Patent No. 672,172, dated April 16, 1901.

Application filed June 26, 1899. Serial No. 721,994. (No model.)

*To all whom it may concern:*

Be it known that I, FRED L. KOEHLER, a citizen of the United States, residing at Chicago, in the county of Cook and State of Illinois, have invented certain new and useful Improvements in Bicycle or Vehicle Spring-Bearings, of which the following is a specification.

The object of this invention is to produce an improved spring-bearing wherein the yielding movement of the spring is entirely at the bearings of the vehicle.

In its application to bicycles a further object is to adapt the spring to the styles of frames in use, so that the invention may be applied to any safety-bicycle without altering the frame thereof.

Figure 6:
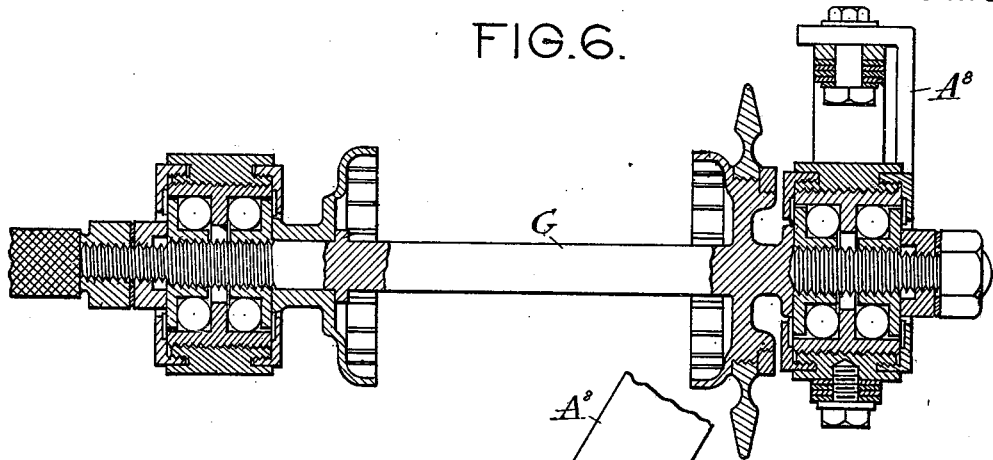
Figure 7:
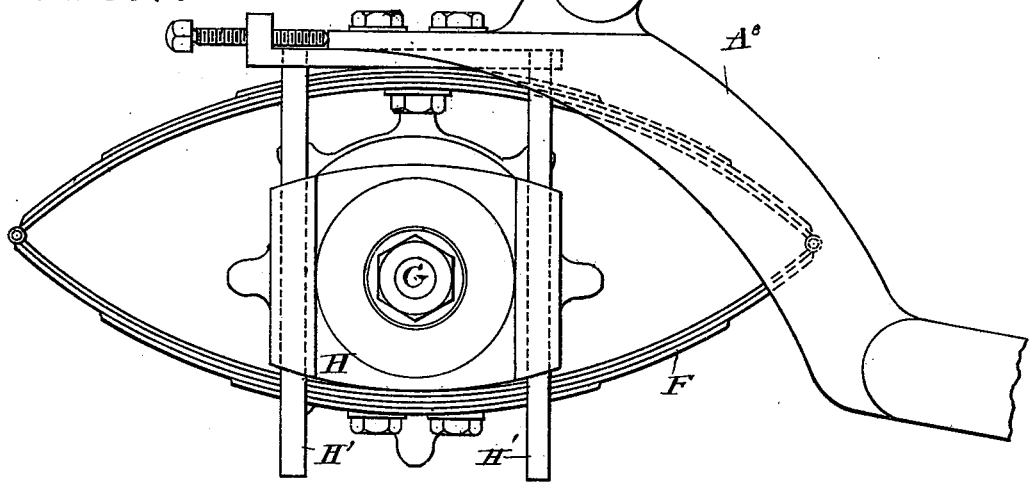
Figure 8:
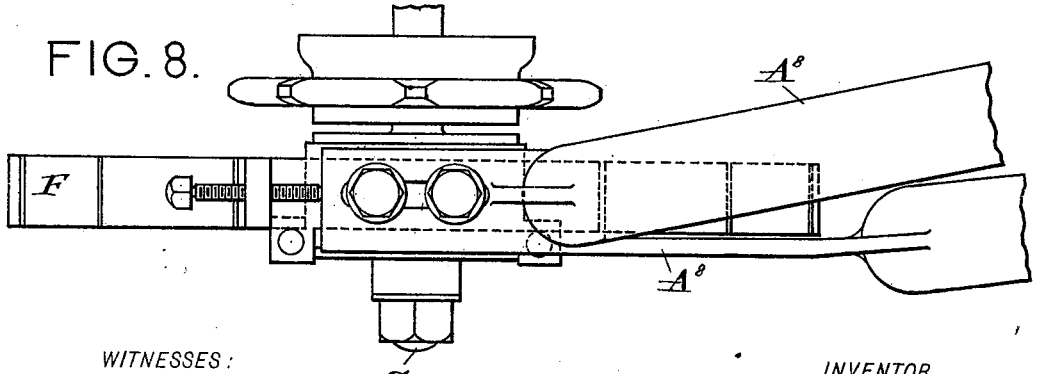
Figure 9:
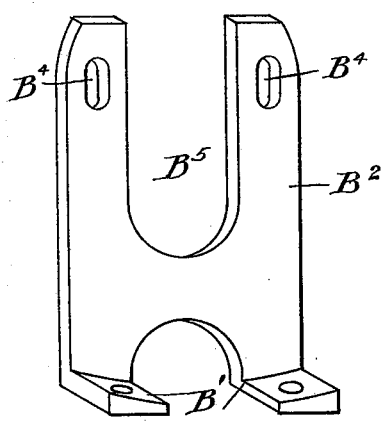
Figure 10:
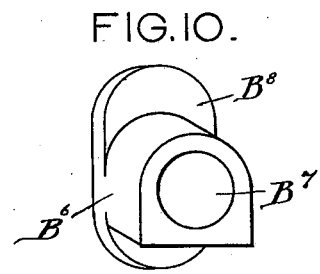
Figure 11:
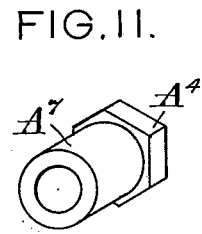
Figure 12:
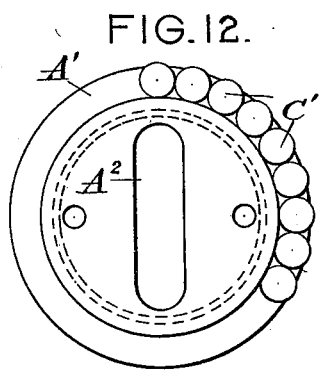
Figure 13:
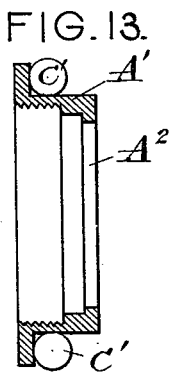
Figure 14:
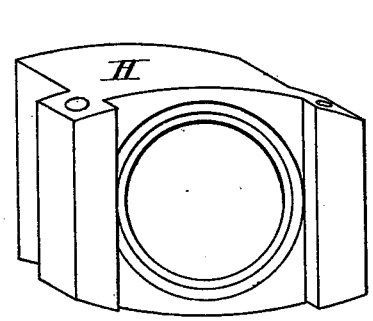
Figure 15:
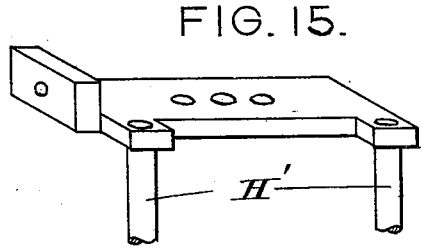
Figure 16:
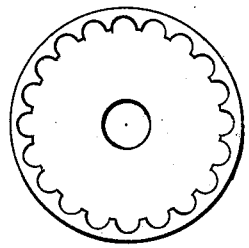

In the accompanying drawings, Figure 1 is a vertical central section through the hub and bearings of the rear wheel of a bicycle embodying my invention. Fig. 2 is a side elevation of the parts shown in Fig. 1. Fig. 3 is a horizontal section on dotted line $x\ x$ of Fig. 2. Fig. 4 is a vertical central section similar to Fig. 1, but showing a modified form of my invention. Fig. 5 is a transverse section through said rear-wheel hub on dotted line $y\ y$ of Fig. 4. Fig. 6 is a vertical central section through the rear wheel of a bicycle, showing a second modification of my invention. Fig. 7 is a side elevation of the parts shown in Fig. 6, and Fig. 8 is a top plan view of that end of the bearing shown in Fig. 6 upon which the sprocket-wheel is mounted. Fig. 9 is a perspective view of the spring-supporting bracket, Fig. 10 of the bearing-block, and Fig. 11 of the jam-nut with its integral bearing-sleeve, all as shown in Figs. 1, 2, and 3. Fig. 12 is a side elevation of, and Fig. 13 is a transverse vertical central section through, one of the two screw-threaded end caps $A'$ of the tubular axle A in the form shown in Figs. 1, 2, and 3. Fig. 14 is a perspective view of the bearing-block, and Fig. 15 a like view of the bracket provided for the attachment of the bicycle-forks, both as shown in the modified form illustrated in Figs. 6, 7, and 8. Fig. 16 is a side elevation of the wheel-hub shown in Fig. 6.

Like letters of reference indicate corresponding parts throughout the several views.

In the embodiment here shown of my invention the forks are supported upon springs suspended from a tubular axle and have a vertically-yielding movement on said springs limited by the internal diameter of the axle. The wheel rotates upon ball-bearings on the axle. In pursuance of this brief outline I have provided a tubular axle A, having the screw-threaded end caps $A'$, each of which end caps is provided with the vertically-elongated opening $A^2$. A bolt $A^3$ extends through said elongated openings through the bearing-blocks resting upon the top of the elliptical supporting-springs and binds the forks of the bicycle rigidly together. This bolt $A^3$ is screw-threaded at its outer ends and is provided with the jam-nuts $A^4$ and $A^5$ and the washer $A^6$. The jam-nut $A^4$ has a bearing-sleeve $A^7$ integral therewith, the purpose of which sleeve will be described later herein.

$A^8$ represents the rear forks of a bicycle.

An elliptical spring B is secured to the ears $B'$ of its supporting-bracket $B^2$, and one of these brackets is affixed to each of the end caps $A'$ of the tubular axle A by the machine-bolts $B^3$, the elongated opening $B^4$ in said brackets providing means for their vertical adjustment, and thereby the adjustment of the tension of the springs B. The upper end of the bracket B is bifurcated, providing the U-shape guideway $B^5$ for a purpose to be mentioned later herein. The bearing-block $B^6$ has the central opening $B^7$ for receiving the sleeve $A^7$ of the jam-nut $A^4$. It also is provided with the guide-plate $B^8$, intended to slide freely in the guideway $B^5$ in the spring-bracket $B^2$.

C is the hub of the wheel. $C'$ represents the balls of the antifriction-bearings therefor, and $C^2$ is the driving-chain sprocket.

In use the weight of the rider borne by the forks is carried upon the elliptical springs B. The bolt $A^3$ plays up and down within the vertical openings $A^2$ in the end caps $A'$ of the tubular axle A. The tension of the springs B is adjusted to accord with the weight of the rider and the condition and nature of the road to be traversed. This adjustment is obtained by raising or lowering the spring-supporting bracket B², made possible by the elongated openings B⁴ therein, as hereinbefore pointed out.

The wheel may be removed from the forks A⁸ by loosening the jam-nuts A⁵ and without disturbing the adjustment of the bearing.

While this invention is shown only in its application to the rear wheel of a bicycle, it is clear that it may readily be adapted to use upon the front wheel.

Figs. 4 and 5 illustrate a modified form of the invention just described, the supporting-springs E being secured to blocks D on the lower inner side of the tubular axle A. The form of the bearing-block D' is somewhat changed from the form of bearing-block shown in Figs. 1, 2, and 3, the hub D' being secured within the elliptical spring E, and both of the elliptical springs of the bearing are placed within the tubular axle A.

In Figs. 6, 7, and 8 a modified form of bearing is shown, wherein the rear forks of the bicycle are secured through brackets I, by means of bolts I', to the upper part of the elliptical spring F. A set-screw I², extending through a screw-threaded opening I³ in the bracket I, provides means for adjusting the tension of the usual driving sprocket-chain (not shown) for the rear wheel. An axle-rod G, carrying the usual wheel and cones, passes through and is rigidly secured to the bearing-block H, Figs. 6, 7, and 8. This bearing-block H has openings H² for receiving the guide-rods H', and as the frame reciprocates vertically the guide-rods slide up and down in the openings H² in the bearing-block H.

I claim as my invention—

1. In a spring-bearing for bicycles and other vehicles, in combination, a tubular axle; end caps therefor; a bracket secured to each of said end caps outside of said tubular axle, which brackets each have a guideway therein; a spring on each of said brackets; bearing-blocks for said springs, adapted to lie in the guideways of said brackets; and means for rigidly connecting the bearing-block with the supports for the vehicle-body.

2. In a spring-bearing for bicycles and other vehicles, in combination, a tubular axle; end caps therefor; a bracket secured to each of said end caps on the outside of said axle, each of which brackets has a guideway therein; a spring on each of said brackets; bearing-blocks for said springs, said bearing-blocks being adapted to lie within the guideways of said brackets; and a rod extending through said bearing-blocks, and being rigidly connected with the supports for the vehicle-body.

3. In a spring-bearing for bicycles and other vehicles, in combination, a tubular axle; a bracket supported by said axle, which bracket has a guideway therein; a spring on said bracket; a bearing-block for said spring, which bearing-block is adapted to lie in the guideway in said bracket; a jam-nut having a tubular portion adapted to lie in said bearing-block; a screw-threaded rod extending through said jam-nut; and a nut on said threaded rod, whereby the bearing-block is rigidly connected with the supports for the vehicle-body.

4. In a spring-bearing for bicycles and other vehicles, in combination, a tubular axle; screw-threaded end caps therefor, each of which end caps is provided with a vertically-elongated opening; a bracket secured to each of said end caps, each of which brackets has a guideway therein; a spring for each of said brackets; bearing-blocks for said springs, which bearing-blocks are adapted to lie in the guideways in said brackets; jam-nuts having tubular portions adapted to lie in the bearing-blocks; a screw-threaded rod extending through said jam-nuts, also through the elongated openings in said end caps; and a nut on said threaded rod, whereby said bearing-blocks are rigidly connected with the supports for the vehicle-body.

5. In a spring-bearing for bicycles and other vehicles, in combination, a tubular axle; screw-threaded end caps therefor, each of which end caps is provided with a vertically-elongated opening; a bracket having an adjustable connection with each of said end caps, each of which brackets has a guideway therein; an elliptical spring for each of said brackets; bearing-blocks for said springs, which bearing-blocks are adapted to lie in the guideways in said brackets; jam-nuts having tubular portions adapted to lie in the bearing-blocks; a screw-threaded rod extending through said jam-nuts, also through the elongated openings in said end caps; and a nut on each end of said threaded rod, whereby said bearing-blocks are rigidly connected with the supports for the vehicle-body.

Signed by me at Chicago, Illinois, this 26th day of October, 1898.

FRED L. KOEHLER.

Witnesses:
THOMAS J. DUNNE,
ALFRED MELTZER.